United States Patent
Lee et al.

(10) Patent No.: US 9,557,844 B2
(45) Date of Patent: Jan. 31, 2017

(54) MOBILE TERMINAL AND CONTROLLING METHOD THEREOF

(71) Applicant: LG ELECTRONICS INC., Seoul (KR)

(72) Inventors: Younghoon Lee, Seoul (KR); Jaeyoung Ji, Seoul (KR); Byoungzoo Jeong, Seoul (KR); Junghyun Lee, Seoul (KR); Nayeoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 14/555,239

(22) Filed: Nov. 26, 2014

(65) Prior Publication Data

US 2015/0145796 A1    May 28, 2015

(30) Foreign Application Priority Data

Nov. 27, 2013  (KR) ........................ 10-2013-0145327

(51) Int. Cl.
| | |
|---|---|
| G06F 3/041 | (2006.01) |
| G06F 3/0488 | (2013.01) |
| G06F 3/0484 | (2013.01) |
| G06F 3/0481 | (2013.01) |

(52) U.S. Cl.
CPC .......... *G06F 3/0414* (2013.01); *G06F 3/0412* (2013.01); *G06F 3/0416* (2013.01); *G06F 3/0484* (2013.01); *G06F 3/04817* (2013.01); *G06F 3/04883* (2013.01); *G06F 2203/04105* (2013.01)

(58) Field of Classification Search
CPC .. G06F 3/0414; G06F 3/04883; G06F 3/0412; G06F 3/04817; G06F 3/0484; G06F 3/0416; G06F 2203/04105
See application file for complete search history.

(56) References Cited

U.S. PATENT DOCUMENTS

| | | | |
|---|---|---|---|
| 2006/0132457 A1* | 6/2006 | Rimas-Ribikauskas | ............................ G06F 3/04847 345/173 |
| 2011/0050619 A1* | 3/2011 | Griffin ................... | G06F 3/0416 345/174 |
| 2011/0084914 A1 | 4/2011 | Zalewski | |
| 2011/0248939 A1* | 10/2011 | Woo ....................... | G06F 3/0416 345/173 |
| 2012/0174042 A1* | 7/2012 | Chang .................... | G06F 3/0488 715/863 |
| 2013/0086522 A1* | 4/2013 | Shimazu ............. | G06F 3/04817 715/810 |
| 2013/0181941 A1* | 7/2013 | Okuno .................... | G06F 3/041 345/174 |

FOREIGN PATENT DOCUMENTS

| | | |
|---|---|---|
| EP | 1 674 977 A2 | 6/2006 |
| EP | 2 214 087 A1 | 8/2010 |

* cited by examiner

*Primary Examiner* — Liliana Cerullo
(74) *Attorney, Agent, or Firm* — Birch, Stewart, Kolasch & Birch, LLP

(57) ABSTRACT

A mobile terminal including a wireless communication unit configured to provide wireless communication; a touch screen configured to display information; and a controller configured to receive a first tapping input on the touch-screen, and perform an output differently depending on whether a detected strength of the first tapping input is included in a first range or a second range.

18 Claims, 18 Drawing Sheets

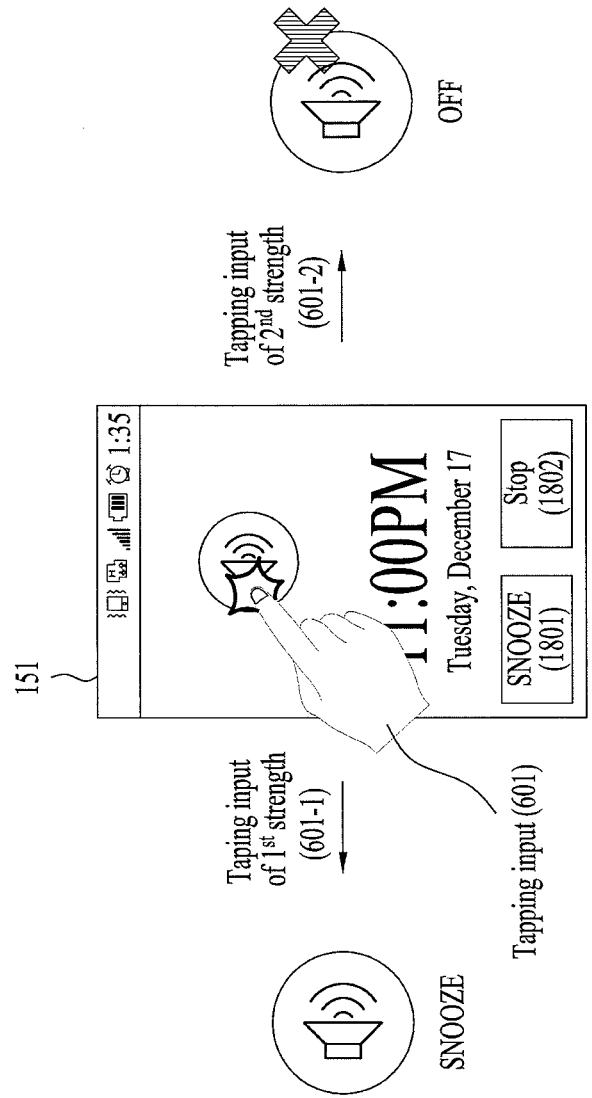

MOBILE TERMINAL AND CONTROLLING METHOD THEREOF

Pursuant to 35 U.S.C. §119(a), this application claims the benefit of earlier filing date and right of priority to Korean Application No. 10-2013-0145327, filed on Nov. 27, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. In addition, mobile terminals can be further classified into handheld terminals and vehicle mounted terminals.

A terminal generally uses a touch screen as an input/output mechanism to secure its mobility or portability. That is, a touchscreen can perform both an input function and an output function. The touchscreen also plays a considerable role in providing an intuitive control of a mobile terminal An intuitive control scheme is one of very significant elements in aspect of a user who uses a mobile terminal. Various kinds of terminals are utilized everywhere in human daily lives. In order to individually acquire methods of controlling these terminals, a user needs excessive learning processes. Thus, the development of mobile terminal controlling methods tends to be focused on the development of a further user-intuitive input method.

For example, a tapping method is an example of the intuitive input method. The tapping method is an input method for a user to tap a prescribed region (i.e., touchscreen) of a mobile terminal prescribed times (e.g., at least once). The tapping method is similar to a knocking action in daily life. According to a dictionary meaning, a knock means an action of indicating a presence of a person around by lightly striking a door before entering a room. Thus, a tapping action can be intuitively understood as an action of notifying a presence of a user to a mobile terminal or a prescribed counterpart with whom the user intends to make a contact through the mobile terminal.

In addition, the mobile terminal can detect the tapping input through various sensors/methods. A first method may include a detection of a tapping input through a touchscreen. When a touchscreen is currently active, a user's touch input applied to the touchscreen is detected and a tapping input can be then detected through the detected touch input. When using the first method, it is disadvantageous in that the tapping input is limitedly applied to the touchscreen only.

A second method may include a detection of a tapping input through an acceleration sensor. If a user applies a tapping input to a prescribed region of the mobile terminal, the acceleration sensor detects an acceleration change of the mobile terminal in response to the tapping input and can then deliver the detected acceleration change to a controller. The controller can then detect the tapping input through the delivered acceleration change of the mobile terminal. However, the second method is disadvantageous in that a sensitivity of the tapping input may be lower than that of other input method.

A third method may include a detection of a tapping input through the acceleration sensor while using the touchscreen. If both of the acceleration sensor and the touchscreen are used, the mobile terminal can detect the tapping input by complementing the disadvantages resulting from the method of using the touchscreen and the method using the acceleration sensor.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a tapping input applied to a body of the mobile terminal can be detected.

Another object of the present invention is to provide a mobile terminal and controlling method thereof, by which the mobile terminal can be more intuitively controlled by detecting a tapping input applied to a body of the mobile terminal and a strength of the tapping input.

To achieve these objects and other advantages and in accordance with the purpose of the invention, as embodied and broadly described herein, a mobile terminal according to an embodiment of the present invention may include a mobile terminal body, a sensor unit configured to detect a tapping input to a portion of the mobile terminal body and a strength of the tapping input, an output unit configured to generate an output corresponding to a control signal of a controller, and the controller configured to control the output unit to generate the output in response to the detected tapping input, the controller, if the detected strength of a first tapping input is included in a first range, controlling the output unit to generate a first output in response to the first tapping input, the controller, if the detected strength of the first tapping input is included in a second range, controlling the output unit to generate a second output in response to the detected first tapping input.

In another aspect of the present invention, as embodied and broadly described herein, a method of controlling a mobile terminal according to an embodiment of the present invention may include the steps of detecting a tapping input to a portion of a body of the mobile terminal and a strength of the tapping input, if the detected strength of a first tapping input is included in a first range, generating a first output in response to the first tapping input, and if the detected strength of the first tapping input is included in a second range, generating a second output in response to the detected first tapping input.

It is to be understood that both the foregoing general description and the following detailed description of the preferred embodiments of the present invention are and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures:

FIG. 18 is a diagram illustrating distinguishing an operation in accordance with a strength of a tapping input in response to an alarm output according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the invention only. Therefore, significant meanings or roles are not given to the suffixes themselves and the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
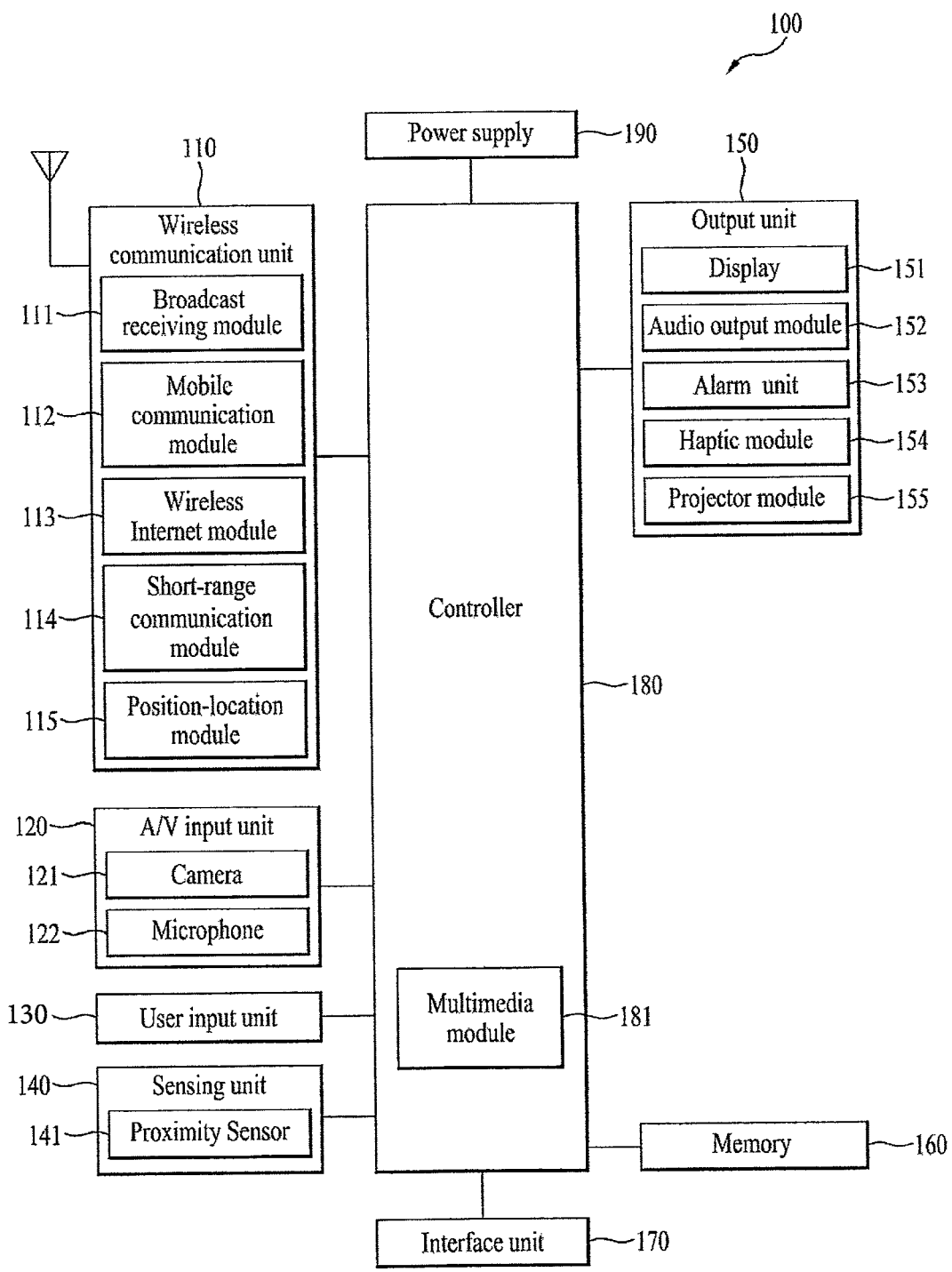
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation. The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H). The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and a sensor for detecting a touch action (hereinafter called 'touch sensor') configures a mutual layer structure (hereinafter called 'touchscreen'), the display 151 can be used as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 can include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
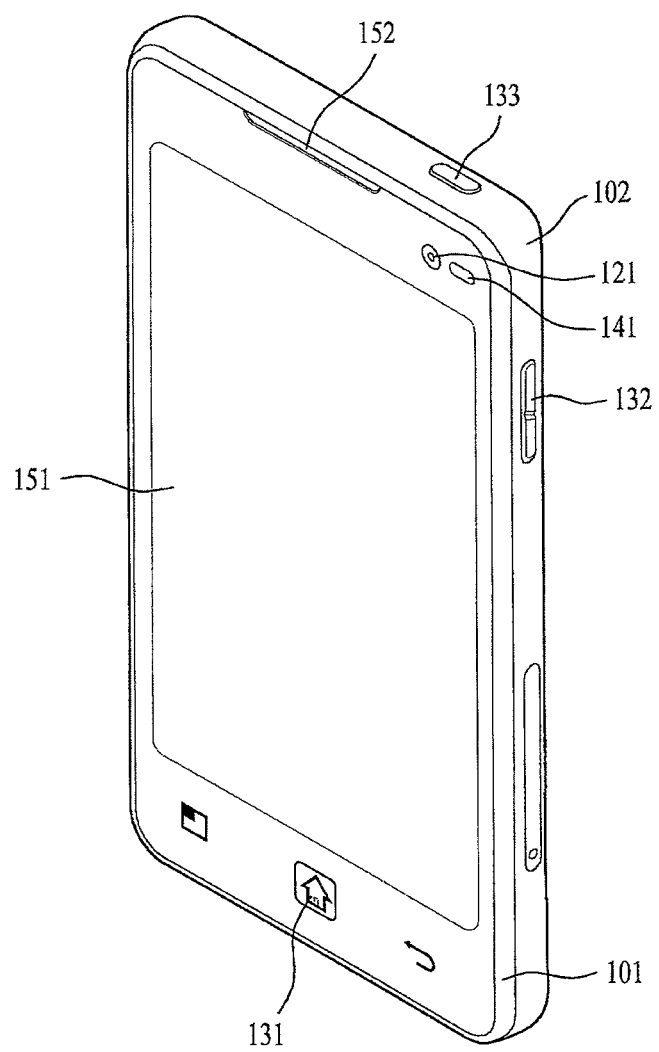
FIG. 2 is a front perspective diagram illustrating one example of a mobile or portable terminal according to an embodiment of the present invention.

FIG. 2 is a front perspective diagram of a mobile terminal according to one embodiment of the present invention. The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 170 (FIG. 3) and the like can be provided to the terminal body, and more particularly, to the front case 101. The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 3:
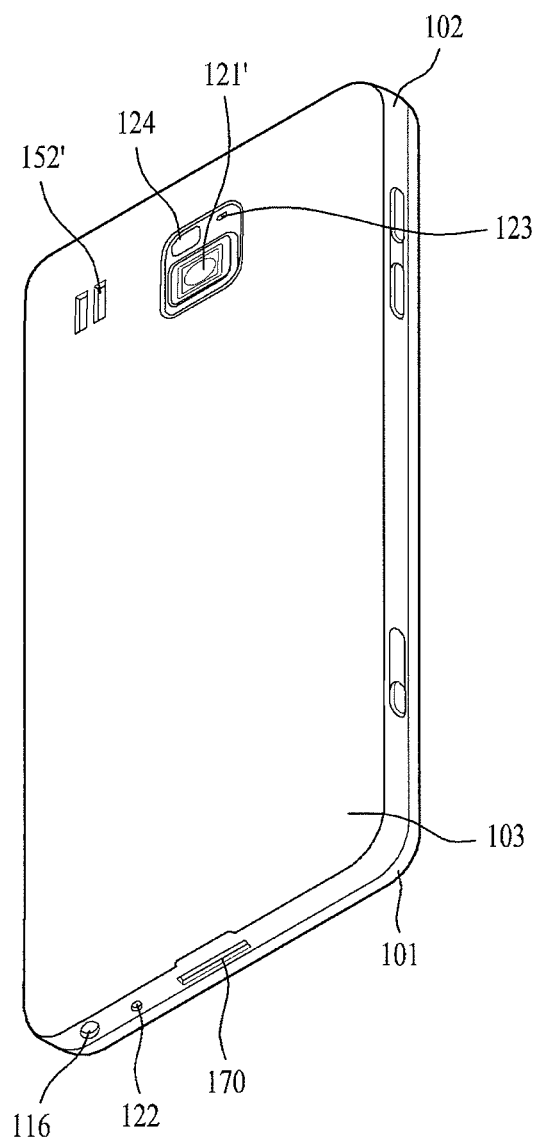
FIG. 3 is a rear perspective diagram of the mobile terminal shown in FIG. 2.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121.' The flash 123 projects light toward a subject when photographing the subject using the camera 121.' When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
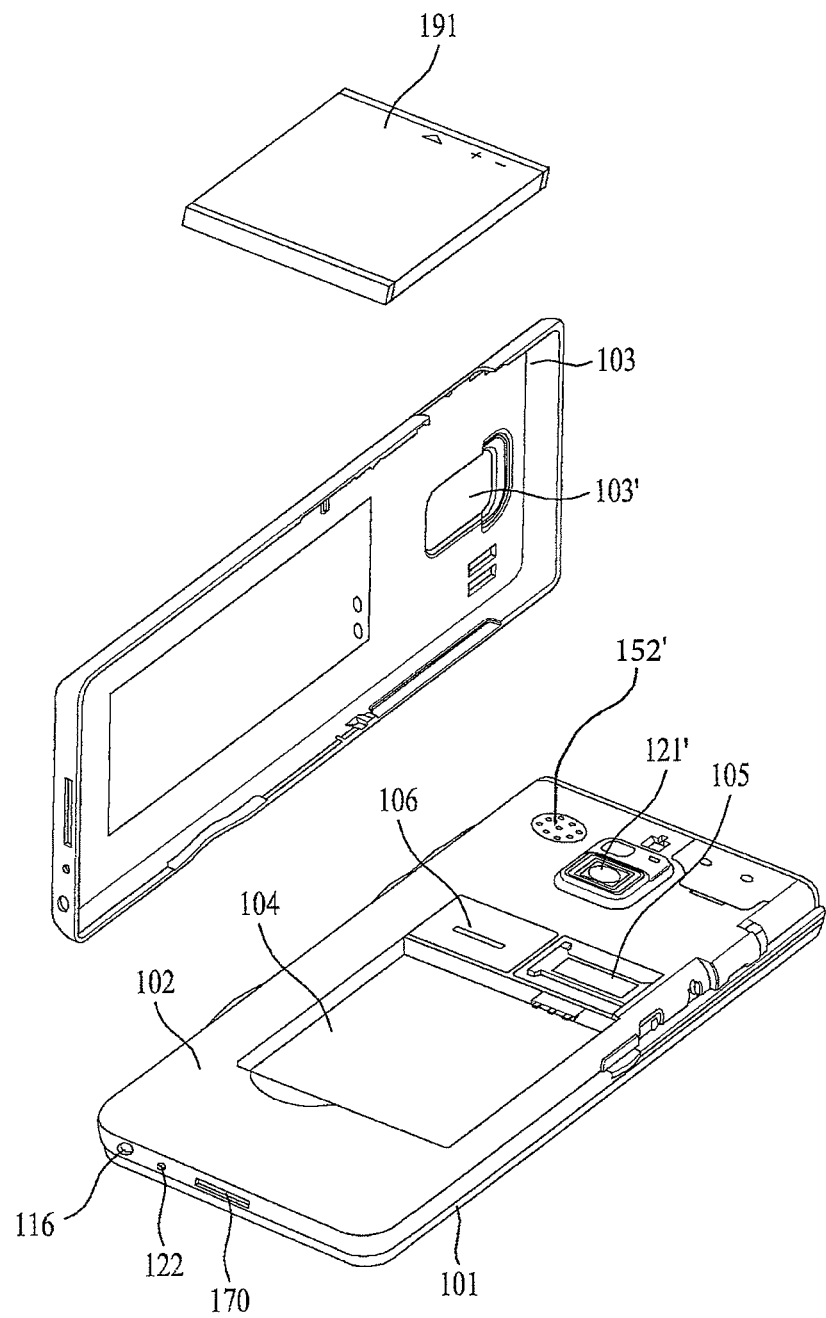
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention. Referring to FIG. 4, a front case 101, a rear case 102, a rear cover (or a battery cover) 103, a camera 121', an interface unit 170, a microphone 122, an audio output unit 152', a battery 191, a battery loading unit 104, a USIM card loading unit 105, and a memory card loading unit 106 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. When the replaceable type is adopted, the battery loading unit 104 is formed on the surface of the rear case 102 to enable a user to detach the corresponding battery. In this instance, a contact terminal is provided to the battery loading unit 104 to be electrically connected to a part installed within the case.

The USIM card loading unit 105 or the memory card loading unit 106 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this instance, since a size of the battery loading unit 104 is extensible, the battery 191 can be oversized.

Although FIG. 4 shows the configuration that the USIM card loading unit 105 or the memory card loading unit 106 is mounted on a backside of the rear case 102, it can be inserted in or separated from the mobile terminal 100 by being inserted in a lateral side of the rear case 102.

The rear cover 103 covers the surface of the rear case 102. Hence, the rear cover 103 can fix the battery, 191, the USIM card, the memory card and the like not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103.

As mentioned in the foregoing description, the mobile terminal 100 according to one embodiment of the present invention can detect a strength of a tapping input applied by a user as well as the tapping input. According to a first method of detecting a tapping input, the mobile terminal 100 can detect a tapping input by a detection of a user's touch input through the touchscreen 151. For instance, if a duration time of a touch input to the touchscreen 151 is shorter than a prescribed time (e.g., 0.1 second, etc.), the controller 180 can determine that the touch input applied to the touchscreen 151 is a tapping input. That is, with the tapping input, the touch input is received and then released within a short time.

When a tapping input is defined as an input of applying tapping at least two times, if the corresponding touch input is applied by a predetermined count in a prescribed time interval, the controller 180 can determine that the tapping input has been received. Moreover, according to the first method, the controller 180 determines a touch region of a user's touch input received through the touchscreen 151 and can then determine a strength of a tapping input in proportion to a size of the touch region. When a tapping input having a relatively weak strength is applied by a user, it can form a touch region of which size is smaller than that of a tapping input having a relatively strong strength. The reason for this is that a size of a finger contacting with the touchscreen 151 increases in proportion to a pressure applied to the finger for applying the corresponding touch.

According to a second method of detecting a tapping input, the controller 180 receives a tapping input by detecting an acceleration change of the mobile terminal in accordance with a user's tapping input and can detect a strength of the tapping input by detecting a strength of the acceleration change. Finally, according to a first method resulting from combining the touchscreen of the first method and the acceleration sensor of the second method, the strength detection of the first method and the strength detection of the second method can be combined together in order to detect a strength of a tapping input.

According to one embodiment of the present invention mentioned in the following description, strength of a tapping input can be detected by at least one of the above-mentioned methods. According to one embodiment of the present invention, distinguishes a visual, auditory and/or haptic feedback output through the mobile terminal 100 based on the detected strength of the tapping input.

Figure 5:
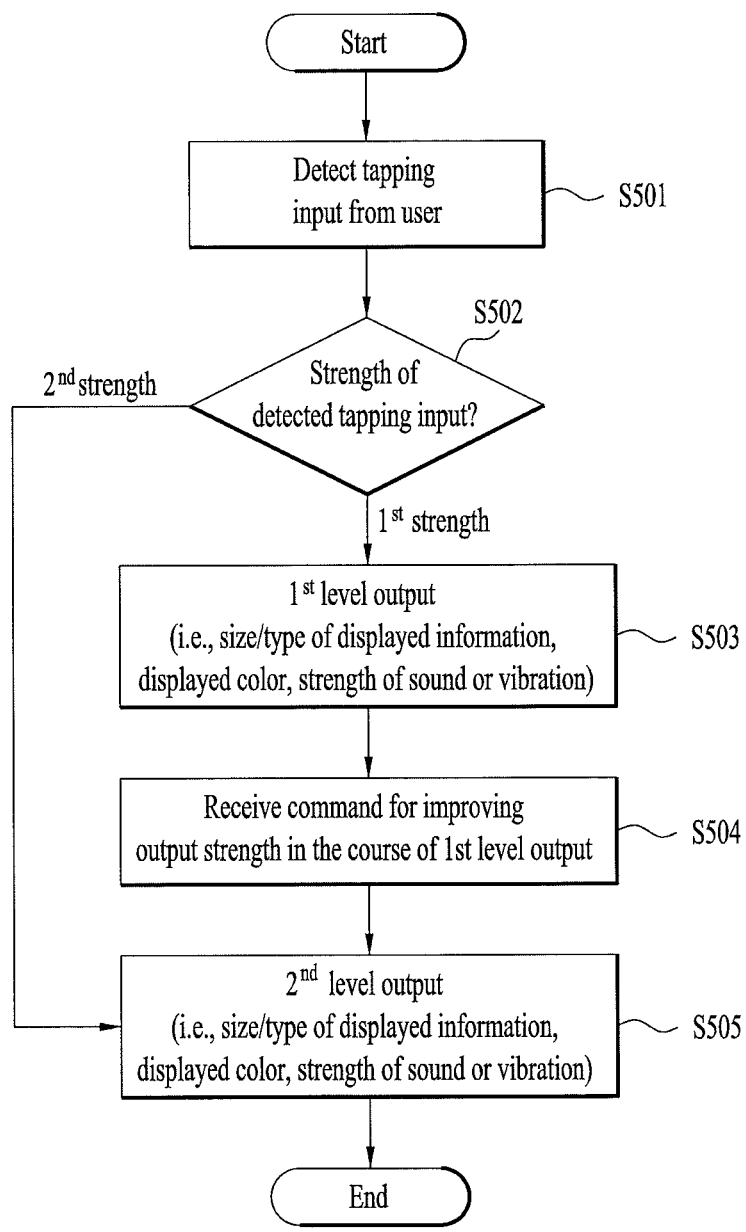
FIG. 5 is a flowchart of a method of distinguishing an audio-visual output in accordance with a strength (level) of a tapping input applied by a user according to one embodiment of the present invention.
Figure 6:
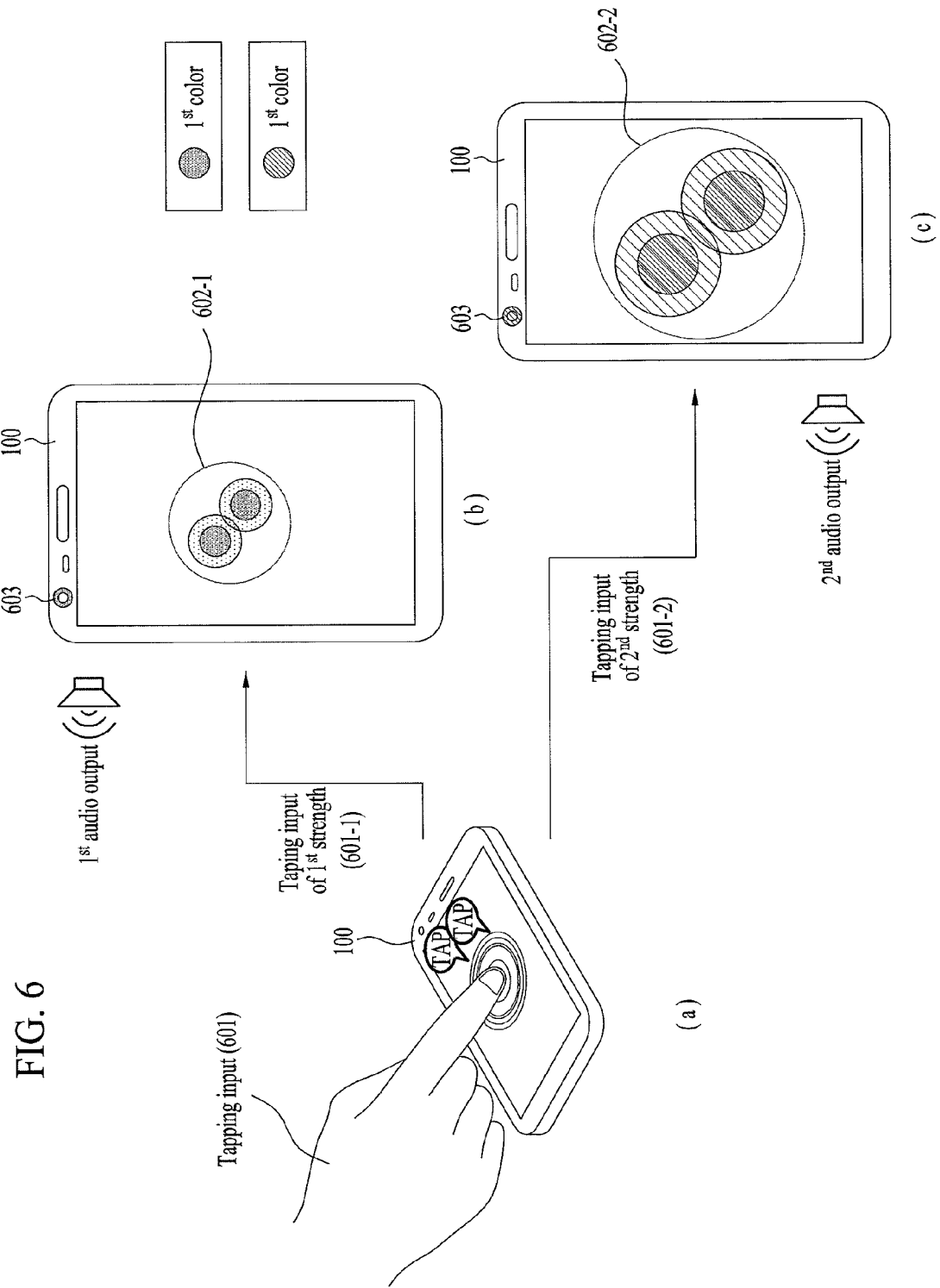
FIG. 6 is a diagram illustrating the concept of a method of distinguishing an audio-visual output in accordance with a strength (level) of a tapping input applied by a user according to one embodiment of the present invention.

Embodiments relating to a controlling method implemented in the above-configured mobile terminal are described with reference to the accompanying drawings as follows. In particular, FIGS. 5 and 6 are a flowchart and a diagram illustrating a method of distinguishing an audio-visual output in accordance with a strength (level) of a tapping input applied by a user according to one embodiment of the present invention. The following description is made with reference to FIGS. 5 and 6.

In FIG. 6 (a), the controller 180 detects a tapping input from a user (S501). The controller 180 determines a strength of the detected tapping input and then goes to one of a step S503 and a step S505 in accordance with a result of the determination. In a step S502, the determined strength of the tapping input is described as sorted into a first strength or a second strength, which can be interpreted as corresponding to the strength of the tapping input belonging to a prescribed range when being expressed as a numerical value.

In particular, when the determined strength of the tapping input is expressed as a numerical value, and if the numerical value is smaller than a prescribed value (first range), the determined strength may be interpreted as a first strength. If the numerical value is equal to or greater than the prescribed value (second range), the determined strength may be interpreted as a second strength. Also, a strength of a tapping input is converted to a numerical value and can be then sorted using a range of the converted numerical value to determine the different strengths.

As a result of the determination made by the controller 180 in the step S502, if the determined strength of the tapping input corresponds to the first strength, the controller 180 goes to the step S503. In the step S503, referring to FIG. 6 (b), the controller 180 can perform a first level output. According to one embodiment of the present invention, an output can include a visual, auditory and/or haptic output through the output unit 150 of the mobile terminal 100. In particular, the output can include a visual output through the touchscreen 151 and an LED unit 603, an auditory output through the audio output module 152, and a haptic output through the haptic module 154.

According to the first step output shown in FIG. 6 (b), the controller 180 can control a visual signal of 'first color' to be output through the LED unit 603. In addition, the controller 180 can control a wavelength image 602-1 of the 'first color' to be output to a position of the touchscreen 151 through which the tapping input is received. Moreover, the controller 180 can control a first audio signal to be output through the audio output module 152.

In the course of the first level output in the step S503, if a command for raising a level of the output is received (S504), the controller 180 can switch the output of the first level to an output of a second level further extended from the output of the first level (S505). When the determined strength of the tapping input is a second strength in the step S502, the controller 180 can directly go to the step S505. In particular, the controller 180 proceeds to the step S505 in direct by skipping the step S503 and the step S504.

According to one embodiment of the present invention, the second level output may include an output not associated with the first level output but may include an output extended from the first level output. For instance, if the first step output is the wavelength image 602-1 of the 'first color', the second level output may include a wavelength image 602-2 of 'second color.' In addition, a size of the wavelength image 602-2 of the 'second color' may be greater than that of the wavelength image 602-1 of the 'first color.'

When the first audio signal is output as an audio output in the first level output, the second level output may include a second audio signal. Alternatively, in the second level output, the first audio signal identical to that of the first level output can be output in volume greater than that of the first level output.

Referring to the example of the second level output shown in FIG. 6 (c), the controller 180 can control a visual signal of 'second color' to be output through the LED unit 603. In addition, the controller 180 can control a wavelength image 602-2 of the 'first color' to be output to a position of the touchscreen 151 through which the tapping input is received. Moreover, the controller 180 can control a second audio signal to be output through the audio output module 152.

So far, the examples of the first and second outputs are described with reference to FIG. 6 (b) and FIG. 6 (c). In the following description, embodiments of the present invention relating to the first output and the second output are explained in detail with reference to the accompanying drawings. For clarity of the following drawings, an exterior of the mobile terminal 100 is omitted but a configuration output through the touchscreen 151 is shown in the drawings only.

Generally, if an input is not received from a user over a prescribed time, the mobile terminal 100 enters an idle state of deactivating or disabling at least one function and/or module in order to minimize a power wasted by the mobile terminal 100. If a user applies a prescribed input to the mobile terminal 100, the state of the mobile terminal 100 can return to a normal state from the idle state.

According to one embodiment of the present invention, a tapping input can be applied as the prescribed input for returning to the normal state from the idle state. According to the dictionary meaning of the term "knock," the tapping input can be intuitively understood as an input of awakening a deactivated mobile terminal 100. Hence, according to the embodiments of the present invention described with reference to FIG. 7 and FIG. 8, a tapping input is applied as an input for restoring a state of the mobile terminal 100.

Figure 7:
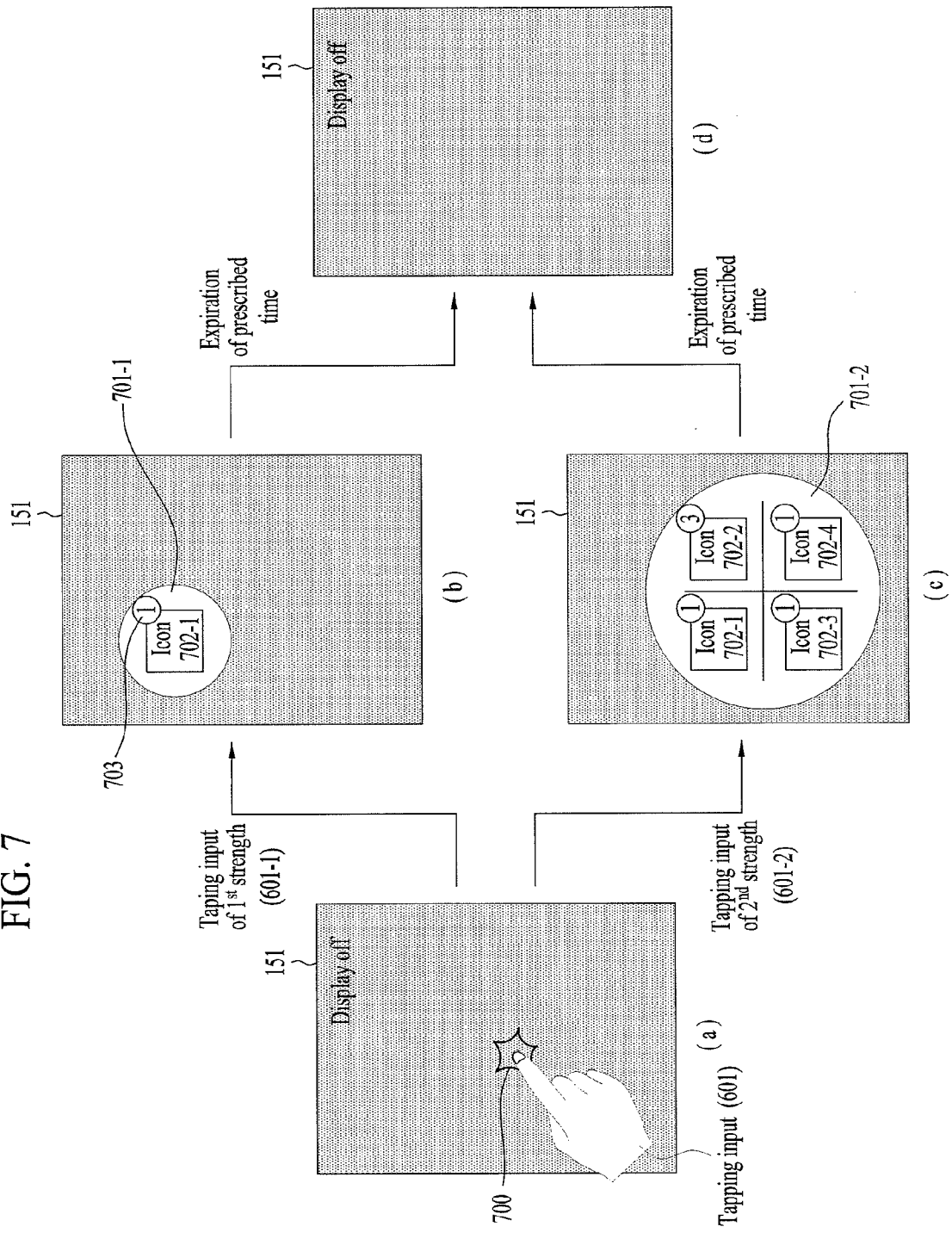
FIG. 7 is a diagram of an output change in accordance with a strength of a tapping input according to a first embodiment of the present invention.

FIG. 7 is a diagram of an output change in accordance with a strength of a tapping input according to a first embodiment of the present invention. Referring to FIG. 7 (a), assume that an output of the touchscreen 151 is deactivated. The controller 180 waits for receiving a user's tapping input 601 in the state shown in FIG. 7 (a). If detecting a reception of the tapping input 601, the controller 180 distinguishes an output in accordance with a strength of the detected tapping input 601.

Further, although an output of the touchscreen 151 is deactivated, if it is necessary to detect a tapping input, the controller 180 can control an input to the touchscreen 151 not to be deactivated. While the output of the touchscreen 151 is deactivated, if it is not necessary to receive an input amounting to a general sensitivity, the controller 180 can switch to a state of detecting a touch of a low sensitivity using a small power only.

According to one embodiment of the present invention, while the output of the touchscreen 151 is deactivated, if the tapping input 601 is applied, a partial region of the touchscreen 151 deactivated overall is activated only and a prescribed information is provided through the activated partial region. Moreover, according to one embodiment of the present invention, an area of an activated region is set wide or narrow based on a strength of the applied tapping input 601 so that a size of the provided information can be adjusted. In particular, for the tapping input 601 of a small strength, the area of the activated region is set narrow. In addition, for the tapping input 601 of a great strength, the area of the activated region is set wide.

When the strength of the received tapping input 601 is a first strength (i.e., a tapping input 601-1), referring to FIG. 7 (b), the controller 180 activates a first region 701-1 of a full region of the touchscreen 151 only and controls the rest of the touchscreen 151 to be maintained in deactivated state. The controller 180 can display at least one application execution icon 702-1 through the first region 701-1 corresponding to the activated partial region. In this instance, the at least one application execution icon 702-1 may include an icon preset by a user or an icon for a most recently notification received application.

The controller 180 can control a patch 703, which indicates the number of notifications received through the respective applications, to be further displayed together with at least one application execution icon 702-1 displayed on the first region 701-1 and the like. Like the example shown in FIG. 7 (b), since the numeral indicated by the patch 703 for the icon 702-1 is '1', a user can confirm that the number of notification received through an application corresponding to the icon 702-1 is one.

When the strength of the received tapping input 601 is a second strength (i.e., a tapping input 601-2), referring to FIG. 7 (c), the controller 180 activates a second region 701-2 of the full region of the touchscreen 151 only and controls the rest of the touchscreen 151 to be maintained in deactivated state. In this instance, an area of the second region 701-2 may be greater than that of the first region 701-1. Likewise, the controller 180 can display at least one or more application run icons 702-1 to 702-4 through the partially activated second region 701-2. In this instance, assuming that the area of the second region 701-2 is greater or wider than that of the first region 701-1, more icons can be output in comparison with the icons shown in FIG. 7 (b). Each of the icons 702-1 to 702-4 can be displayed with the patch 703 described with reference to FIG. 7 (b). Each of the at least one or more application run icons 702-1 to 702-4 may include an icon preset by a user or an icon for a most recently notification received application.

Referring to FIG. 7 (d), after the controller 180 has activated the prescribed regions 701-1 and 701-2 of the full touchscreen 151, if not input is received over a prescribed time, the controller 180 can return to an originally deactivated state that the touchscreen is fully deactivated.

According to one embodiment of the present invention described with reference to FIG. 7, an area of an activated prescribed region and the number of icons displayed on the prescribed region are adjusted in response to a tapping input of first/second strength. Moreover, according to another embodiment of the present invention, it is proposed to display information of other types as well as the number of icons. Such an embodiment shall be described in detail with reference to FIG. 8 as follows.

Figure 8:
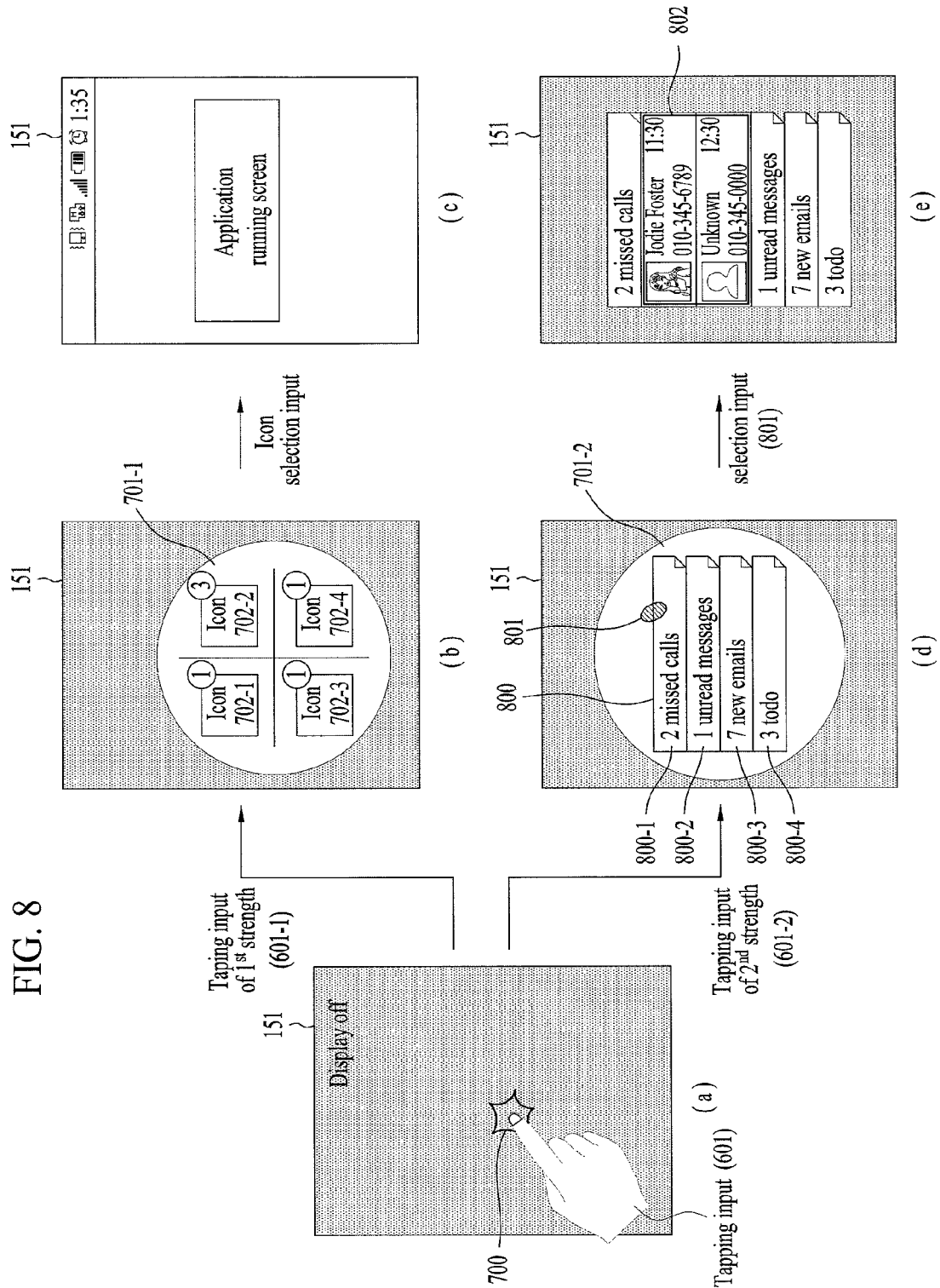
FIG. 8 is a diagram of an output change in accordance with a strength of a tapping input according to a second embodiment of the present invention.

FIG. 8 is a diagram of an output change in accordance with a strength of a tapping input according to a second embodiment of the present invention. Referring to FIG. 8 (a), assume that an output of the touchscreen 151 is deactivated. The controller 180 waits for receiving a user's tapping input 601 in the state shown in FIG. 8 (a). If detecting a reception of the tapping input 601, the controller 180 distinguishes an output in accordance with a strength of the detected tapping input 601.

Further, although an output of the touchscreen 151 is deactivated, if it is necessary to detect a tapping input, the controller 180 can control an input to the touchscreen 151 not to be deactivated. While the output of the touchscreen 151 is deactivated, if it is not necessary to receive an input amounting to a general sensitivity, the controller 180 can switch to a state of detecting a touch of a low sensitivity using a small power only.

When the strength of the received tapping input 601 is a first strength (i.e., a tapping input 601-1), referring to FIG. 8 (b), the controller 180 activates a first region 701-1 of a full region of the touchscreen 151 only and controls the rest of the touchscreen 151 to be maintained in deactivated state. The controller 180 can display at least one or more application run icons 702-1 to 702-4 through the first region 701-1 corresponding to the activated partial region. In this instance, each of the at least one application run icons 702-1 to 702-4 may include an icon preset by a user or an icon for a most recently notification received application.

If one of the at least one or more application run icons 702-1 to 702-4 displayed on the first region 701-1 is selected, referring to FIG. 8 (c), the controller 180 executes an application corresponding to the selected icon and can control an execution screen of the corresponding application to be output to the touchscreen 151.

When the strength of the received tapping input 601 is a second strength (i.e., a tapping input 601-2), referring to FIG. 8 (d), the controller 180 activates a second region 701-2 of the full region of the touchscreen 151 only and controls the rest of the touchscreen 151 to be maintained in deactivated state. In this instance, an area of the second region 701-2 may be greater than that of the first region 701-1.

The controller 180 can control a notification list 800 to be output through the partially activated second region 701-2. According to one embodiment of the present invention described with reference to FIG. 8, different information is displayed through the partially activated first and second regions, respectively. In this instance, the notification list 800 can include at least one or more notifications 800-1 to 800-4 unchecked by a user.

When receiving an input 801 of selecting one notification 800-1 from the notification list 800, referring to FIG. 8 (e), the controller 180 can further display a detailed information 802 on the selected notification 800-1. According to the embodiments of the present invention described with reference to FIG. 7 and FIG. 8, the strength of the tapping input is sorted into the first strength or the second strength, by which the present invention is non-limited. An embodiment for sorting the strength of the tapping input into one of first to third strengths is described in detail with reference to FIG. 9 and FIG. 10 as follows.

Figure 9:
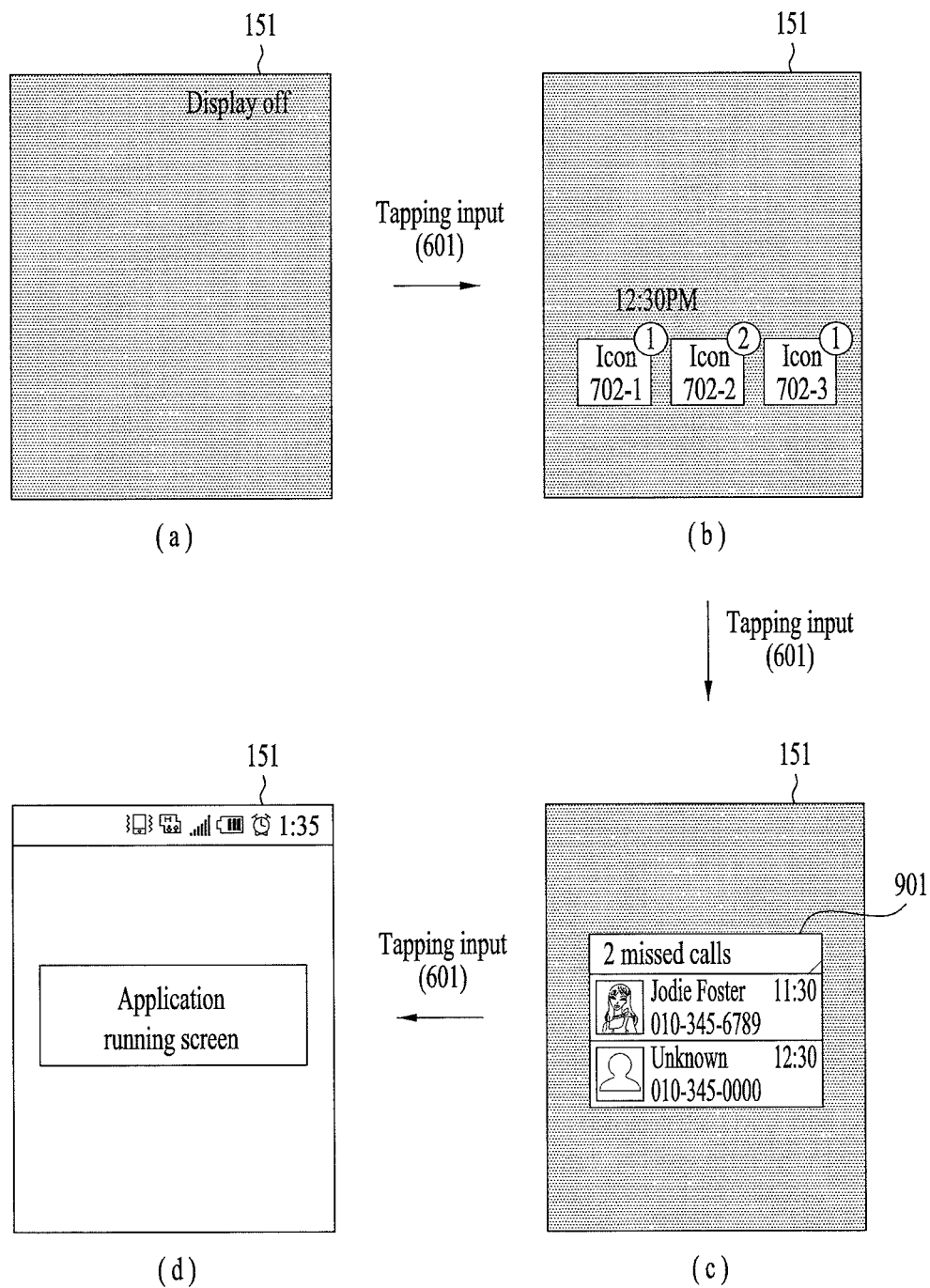
FIG. 9 and FIG. 10 are diagrams of an output change in accordance with a strength of a tapping input according to a third embodiment of the present invention.
Figure 10:
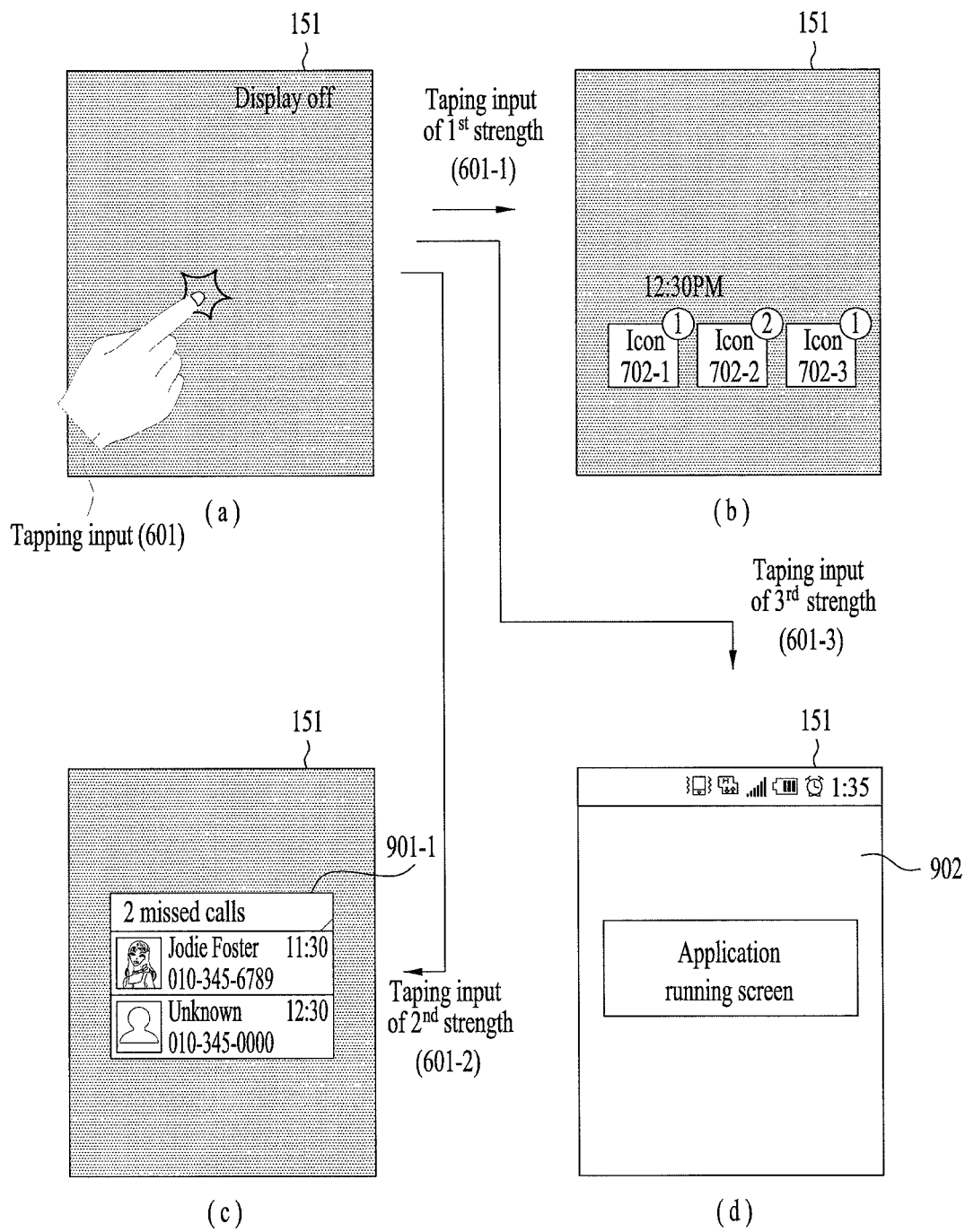

FIG. 9 and FIG. 10 are diagrams of an output change in accordance with a strength of a tapping input according to a third embodiment of the present invention. Referring to FIG. 9, the controller 180 sequentially provides a first output (FIG. 9 (b)), a second output (FIG. 9 (c)) and a third output (FIG. 9 (d)) under the control of the touchscreen 151 in response to the sequentially input tapping inputs of the same strength. The respective outputs are described in detail as follows.

Referring to FIG. 9 (a), assume that an output of the touchscreen 151 is deactivated. When receiving a tapping input 601 of a first strength in the state shown in FIG. 9 (a), referring to FIG. 9 (b), the controller 180 provides the first output through the touchscreen 151. In this instance, according to the first output, after at least one partial region (or a full region) of a deactivated display has been activated, at least one or more application run icons 702-1 to 702-3 are displayed through the activated region. Additionally, the controller 180 can display the aforementioned patch together with each of the displayed at least one or more application run icons 702-1 to 702-3.

If receiving an additional tapping input 601 of the first strength in the first output state shown in FIG. 9 (*b*), referring to FIG. 9 (*c*), the controller provides the second output through the touchscreen 151. In this instance, the second output can display a notification popup window 801 including a notification list received by the mobile terminal 100 and details of the notification list.

If receiving an additional tapping input 601 of the first strength in the second output state shown in FIG. 9 (*c*), referring to FIG. 9 (*d*), the controller provides the third output through the touchscreen 151. In this instance, the third output can include an execution screen of a most recently run application. In particular, the controller 180 can provide the third output while running the most recently run application.

According to the embodiment described with reference to FIG. 9, the first to third outputs are sequentially provided by the tapping inputs of the same strength, respectively. Yet, the first to third outputs can be directly provided in response to tapping inputs of different strengths, respectively. This is described with reference to FIG. 10 as follows.

Referring to FIG. 10 (*a*), like the example shown in FIG. 9 (*a*), assume that an output of the touchscreen 151 is deactivated. In the state shown in FIG. 10 (*a*), if a tapping input 601-1 of a first strength is received, the controller 180 can provide a first output shown in FIG. 10 (*b*). In the state shown in FIG. 10 (*a*), if a tapping input 601-2 of a second strength is received, the controller 180 can provide a second output shown in FIG. 10 (*c*). In the state shown in FIG. 10 (*a*), if a tapping input 601-3 of a third strength is received, the controller 180 can provide a third output shown in FIG. 10 (*d*).

In particular, since the outputs sequentially provided in response to the tapping inputs of the same strength in FIG. 9 can be directly provided in response to the tapping inputs of the different strengths in FIG. 10, it is advantageous in that a user can be provided with a desired output using a tapping input of a corresponding strength.

Meanwhile, according to the second output provided in FIG. 10 (*c*), a notification list about missed calls and details of the notification list are provided through a first notification popup window 901-1. Regarding a type of a notification provided to a user, if a notification of a type different from that of the first notification popup window 901-1 is present, notifications of different types can be provided through a second notification popup window 901-2 and the like. This is described in detail with reference to FIG. 11 as follows.

First of all, there can exist notifications of various types/classifications (categories) depending on types of the notifications. As examples of notifications, there are a missed call notification, a new message notification, a schedule notification and the like, by which the notifications are non-limited. For enhancement of user's convenience, it may be appropriate for a notification to be provided in accordance with a type/category of the corresponding notification. Thus, according to one embodiment of the present invention described with reference to FIG. 11, notifications are provided per type/category using separate notification popup windows 901-1, 901-2 . . . etc.

Figure 11:
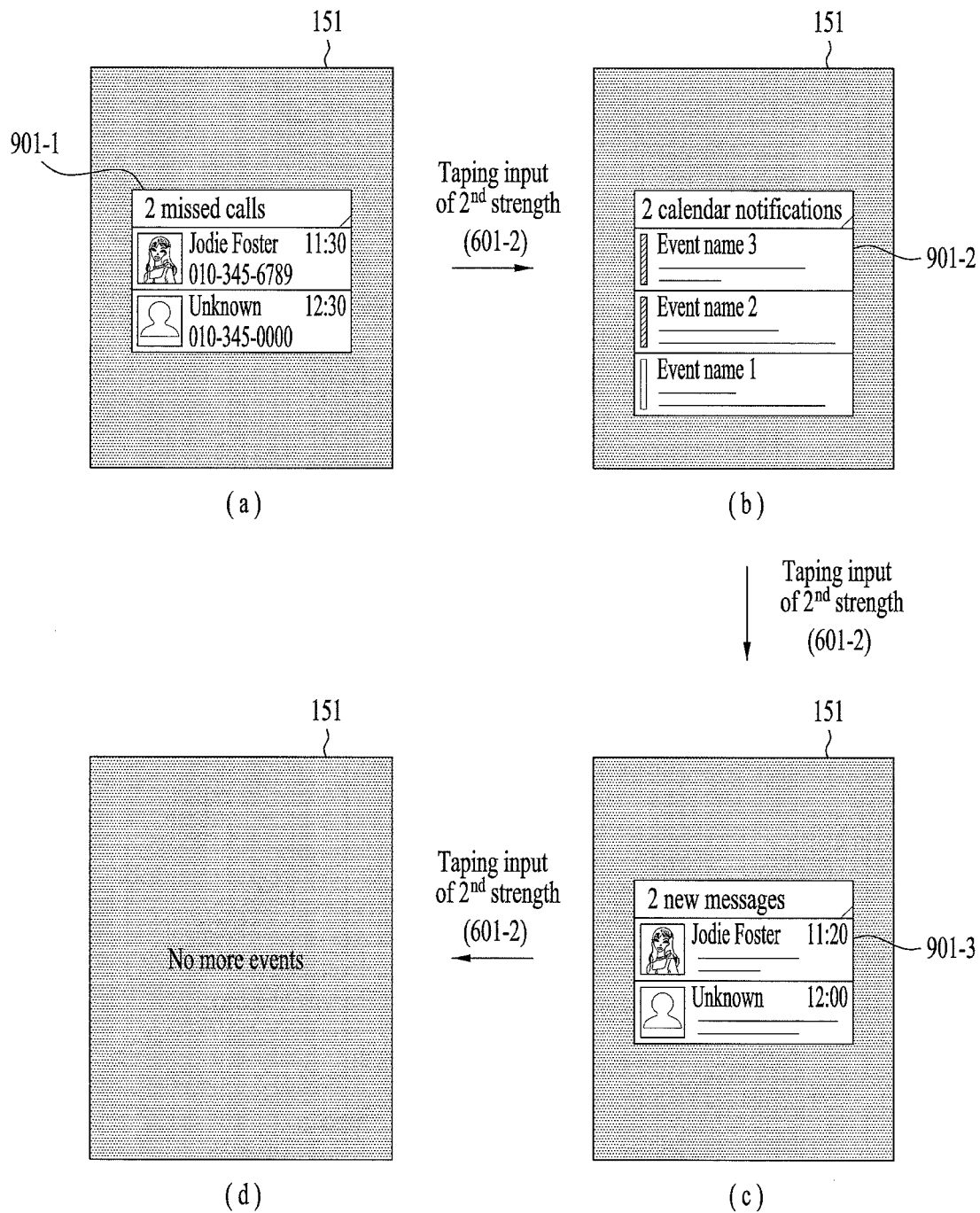
FIG. 11 is a diagram illustrating a method of changing and providing a type of an indication in response to a sequentially applied tapping input according to one embodiment of the present invention.

FIG. 11 is a diagram illustrating a method of changing and providing a type of an indication in response to a sequentially applied tapping input according to one embodiment of the present invention. FIG. 11 (*a*) is a diagram illustrating configuration of the second output described with reference to FIG. 10 (*c*). The second output shown in FIG. 10 (*c*) is the output corresponding to the tapping input 601-2 of the second strength. In the state of FIG. 11 (*a*) showing that a first notification popup window 901-1 for outputting a notification of a first type is currently displayed, if detecting that the tapping input 601-2 of the second strength, which is the same strength, is received again, referring to FIG. 11 (*b*), the controller 180 can control a second notification popup window 901-2 to be displayed instead of the first notification popup window 901-1.

Likewise, while the second notification popup window 901-2 is displayed, if detecting that the tapping input 601-2 of the second strength, which is the same strength, is received again, referring to FIG. 11 (*c*), the controller 180 can control a third notification popup window 901-3 to be displayed instead of the second notification popup window 901-2. If there is no more notifications to display according to the display of the third notification popup window 901-3, referring to FIG. 11 (*d*), the controller 180 can display that there is no more event notification in response to an additional tapping input 601-2.

So far, while an output of the touchscreen 151 is deactivated, a method of controlling activation of the deactivated output of the touchscreen 151 through a tapping input is described. While the touchscreen 151 is activated, a controlling method for displaying detailed information through a tapping input to a prescribed icon 702 is described in detail with reference to FIGS. 12 to 15.

Meanwhile, while the touchscreen 151 is activated, a tapping input 601 applied to the touchscreen 151 needs to be clearly distinguished from a general touch input. A first method of distinguishing a tapping input 601 and a general touch input from each other according to one embodiment of the present invention distinguishes them in accordance with a strength of a corresponding input. In particular, if a touch input is applied with a strength greater than a prescribed reference strength, the mobile terminal 100 according to one embodiment of the present invention can recognize the touch input as a general touch input. If a touch input is applied with a strength smaller than a prescribed reference strength, the mobile terminal 100 according to one embodiment of the present invention can recognize the touch input as a tapping input.

A second method of distinguishing a tapping input 601 and a general touch input from each other according to one embodiment of the present invention distinguishes them in accordance with a duration time of a corresponding input. In particular, if a touch input is applied for a time longer than a prescribed reference time, the mobile terminal 100 according to one embodiment of the present invention can recognize the touch input as a general touch input. If a touch input is applied for a time shorter than the prescribed reference time, the mobile terminal 100 according to one embodiment of the present invention can recognize the touch input as a tapping input.

A third method of distinguishing a tapping input 601 and a general touch input from each other according to one embodiment of the present invention distinguishes them in accordance with a presence or non-presence of a consecutive touch input. In particular, if a touch input is applied once in a prescribed reference interval, the mobile terminal 100 according to one embodiment of the present invention can recognize the touch input as a general touch input. If touch inputs are applied at least twice in the prescribed reference interval, the mobile terminal 100 according to one embodiment of the present invention can recognize the touch input as a tapping input.

FIGS. 12 to 15 are diagrams illustrating an output change in accordance with a strength of a tapping input according to a fourth embodiment of the present invention. Referring to FIGS. 12 to 15, the mobile terminal 100 currently displays application run icons 702-1 to 702-3 through the touchscreen 151. If each of the application run icons 702-1 to 702-3 is selected by a user, the controller 180 executes the corresponding application and can display a execution screen through the touchscreen 151. Moreover, as mentioned in the foregoing description, the controller 180 can display each of the application run icons 702-1 to 702-3 together with a patch 703 indicating the number of corresponding notifications. For instance, referring to FIG. 12 (*a*), since the patch 703 displayed together with the first application execution icon 702-1 indicates the numeral '2', a user can determine that there are 2 notifications corresponding to a first application.

Figure 12:
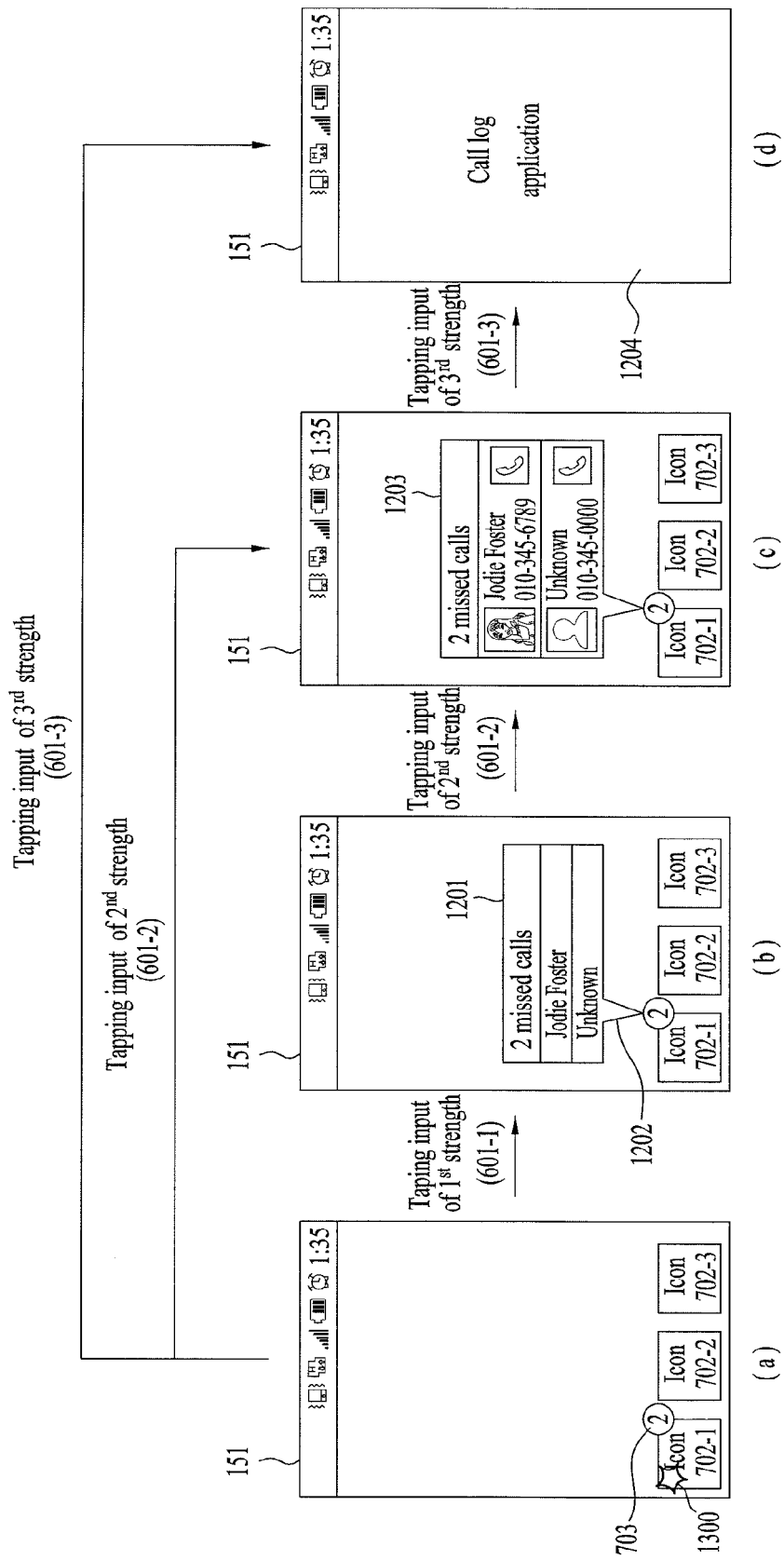
FIGS. 12 to 15 are diagrams illustrating an output change in accordance with a strength of a tapping input according to a fourth embodiment of the present invention.

According to one embodiment of the present invention, if detecting that a tapping input 601-1 of a first strength is applied to a prescribed application execution icon 702, the controller 180 is proposed to provide a first output corresponding to a prescribed application (FIG. 12 (*b*)). According to the example shown in FIG. 12 (*b*), a notification list popup window 1201 corresponding to a first application is displayed as the first output.

According to the example shown in FIG. 12, assume that the first application execution icon 702-1 corresponds to a phone transceiving application. If so, the notification list popup window 1201 can output a notification list of the phone transceiving application and the notification list can include a missed call notification. According to the example shown in FIG. 12 (*b*), the notification list displayed on the notification list popup window 1201 indicates that there are two missed calls respectively received from 'Jodie Foster' and 'Unknown.'

According to one embodiment of the present invention, the notification list popup window 1201 can have a word balloon configuration and can further include a word balloon tail 1202 configured to indicate a notification list for a prescribed application. The controller 180 can control the word balloon tail 1202 of the notification list popup window 1201 to face a corresponding application execution icon 702. This is identically applicable to an extended notification list 1203 that will be described with reference to FIG. 12 (*c*).

In the state shown in FIG. 12 (*b*), if a tapping input 601-2 of a second strength is applied to a prescribed application execution icon 702, the controller 180 can provide a second output corresponding to a prescribed application. According to the example shown in FIG. 12 (*c*), an extended notification list popup window 1203 is configured to further display a detailed content of a notification. The extended notification list popup window 1203 can include detailed contents for two missed calls respectively received from 'Jodie Foster' and 'Unknown.' For instance, the extended notification list popup window 1203 can include incoming phone numbers and received times of the two missed calls respectively received from 'Jodie Foster' and 'Unknown.'

In the state shown in FIG. 12 (*c*), if a tapping input 601-3 of a third strength is applied to a prescribed application execution icon 702, the controller 180 can provide a third output corresponding to a prescribed application. According to the example shown in FIG. 12 (*d*), an execution screen 1204 of a phone transceiving application is displayed as the third output.

As mentioned in the foregoing description, in response to the tapping inputs 601-1 to 601-3 sequentially applied to the run icon 702 of the prescribed application, the controller 180 can control the first to third outputs corresponding to the prescribed application to be sequentially displayed. Moreover, according to one embodiment of the present invention, instead of the sequential tapping input 601, one of the first to third outputs can be directly displayed using a tapping input 601 of a different strength.

In particular, in the state shown in FIG. 12 (*a*), if detecting that a tapping input 601-2 of a second strength is applied to a run icon 702-1 of a first application, the controller 180 can directly provide a second output corresponding to the first application (i.e., skipping a first output) (FIG. 12 (*c*)). Moreover, in the state shown in FIG. 12 (*a*), if detecting that a tapping input 601-3 of a third strength is applied to a run icon 702-1 of a first application, the controller 180 can directly provide a third output (cf. '1204' in FIG. 12 (*d*)) corresponding to the first application.

One embodiment of the present invention is described with reference to FIG. 13 as follows. According to one embodiment of the present invention, if detecting that a tapping input 601-1 of a first strength is applied to a prescribed application execution icon 702, the controller 180 can output a first output corresponding to the prescribed application (FIG. 13 (*b*)). According to the example shown in FIG. 13 (*b*), a notification list popup window 1301 corresponding to a first application is displayed as the first output.

Figure 13:
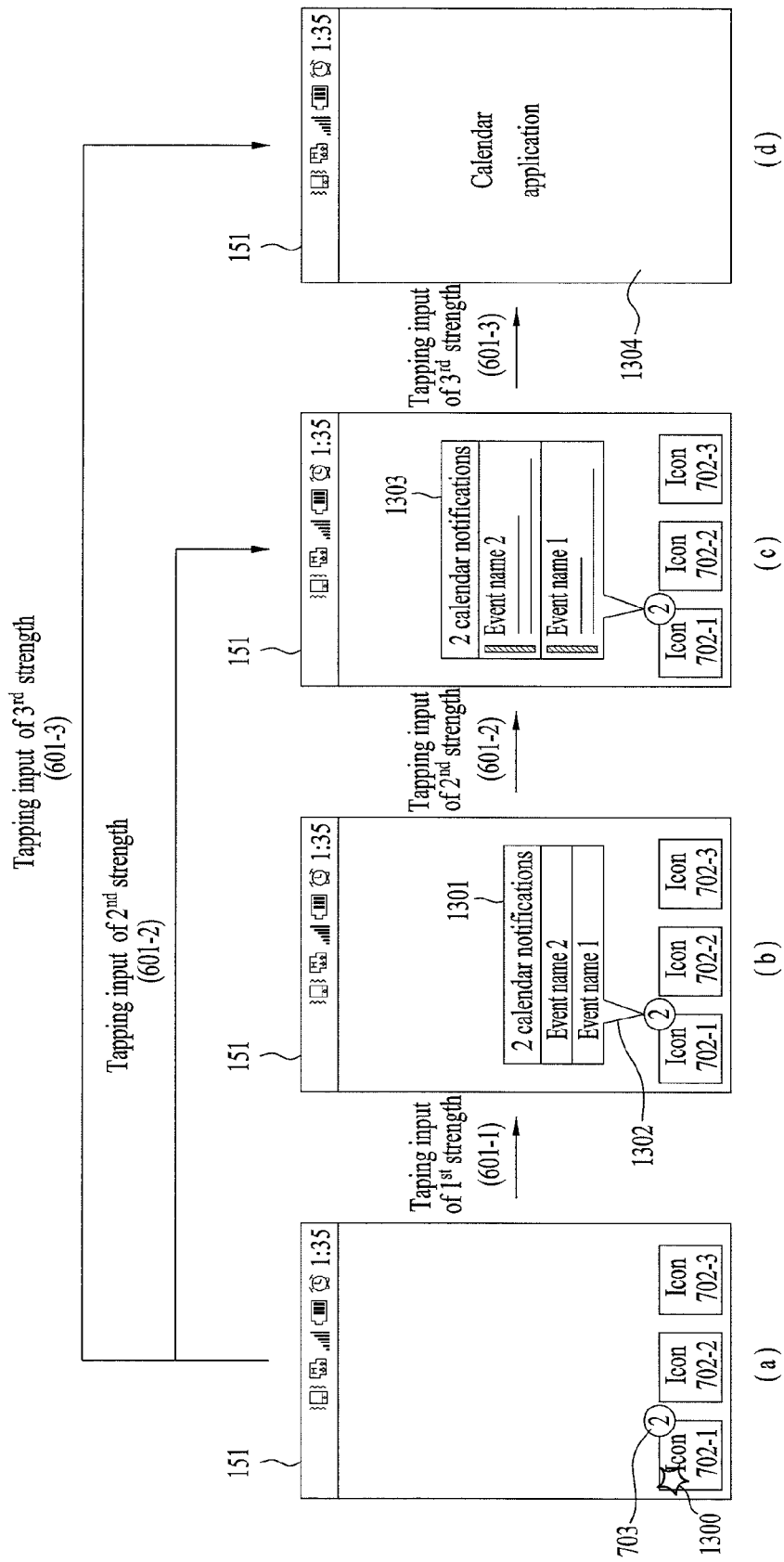

In the example shown in FIG. 13, assume that a first application execution icon 702-1 corresponds to a schedule management application. If so, the notification list popup window 1301 can output a notification list of the schedule management application and the notification list can include a notification of a setup time for a saved event. According to the example shown in FIG. 13 (*b*), the notification list displayed on the notification list popup window 1301 indicates that the setup times of 'event name 1' and 'event name 2' have expired.

According to one embodiment of the present invention, the notification list popup window 1301 can have a word balloon configuration and can further include a word balloon tail 1302 configured to indicate a notification list for a prescribed application. The controller 180 can control the word balloon tail 1302 of the notification list popup window 1301 to face a corresponding application execution icon 702. This is identically applicable to an extended notification list 1303 that will be described with reference to FIG. 13 (*c*).

In the state shown in FIG. 13 (*b*), if a tapping input 601-2 of a second strength is applied to a prescribed application execution icon 702, the controller 180 can provide a second output corresponding to a prescribed application. According to the example shown in FIG. 13 (*c*), an extended notification list popup window 1303 is configured to further display a detailed content of a notification.

The extended notification list popup window 1303 can include detailed contents for 'event name 1' and 'event name 2.' For instance, the extended notification list popup window 1303 can include setup date and time information on the two events 'event name 1' and 'event name 2.' In the state shown in FIG. 13 (*c*), if a tapping input 601-3 of a third strength is applied to a prescribed application execution icon 702, the controller 180 can provide a third output corresponding to a prescribed application. According to the example shown in FIG. 13 (*d*), an execution screen 1304 of a schedule management application is displayed as the third output.

As mentioned in the foregoing description, in response to the tapping inputs 601-1 to 601-3 sequentially applied to the run icon 702 of the prescribed application, the controller 180 can control the first to third outputs corresponding to the prescribed application to be sequentially displayed. Moreover, according to one embodiment of the present invention, instead of the sequential tapping input 601, one of the first to third outputs can be directly displayed using a tapping input 601 of a different strength.

In particular, in the state shown in FIG. 13 (*a*), if detecting that a tapping input 601-2 of a second strength is applied to a run icon 702-1 of a first application, the controller 180 can directly provide a second output corresponding to the first application (i.e., skipping a first output) (FIG. 13 (*c*)). Moreover, in the state shown in FIG. 13 (*a*), if detecting that a tapping input 601-3 of a third strength is applied to a run icon 702-1 of a first application, the controller 180 can directly provide a third output (cf. '1304' in FIG. 13 (*d*)) corresponding to the first application.

One embodiment of the present invention is described with reference to FIG. 14 as follows. According to one embodiment of the present invention, if detecting that a tapping input 601-1 of a first strength is applied to a prescribed application execution icon 702, the controller 180 can provide a first output corresponding to a prescribed application (FIG. 14 (*b*)). According to the example shown in FIG. 14 (*b*), a notification list popup window 1401 corresponding to a first application is displayed as the first output.

Figure 14:
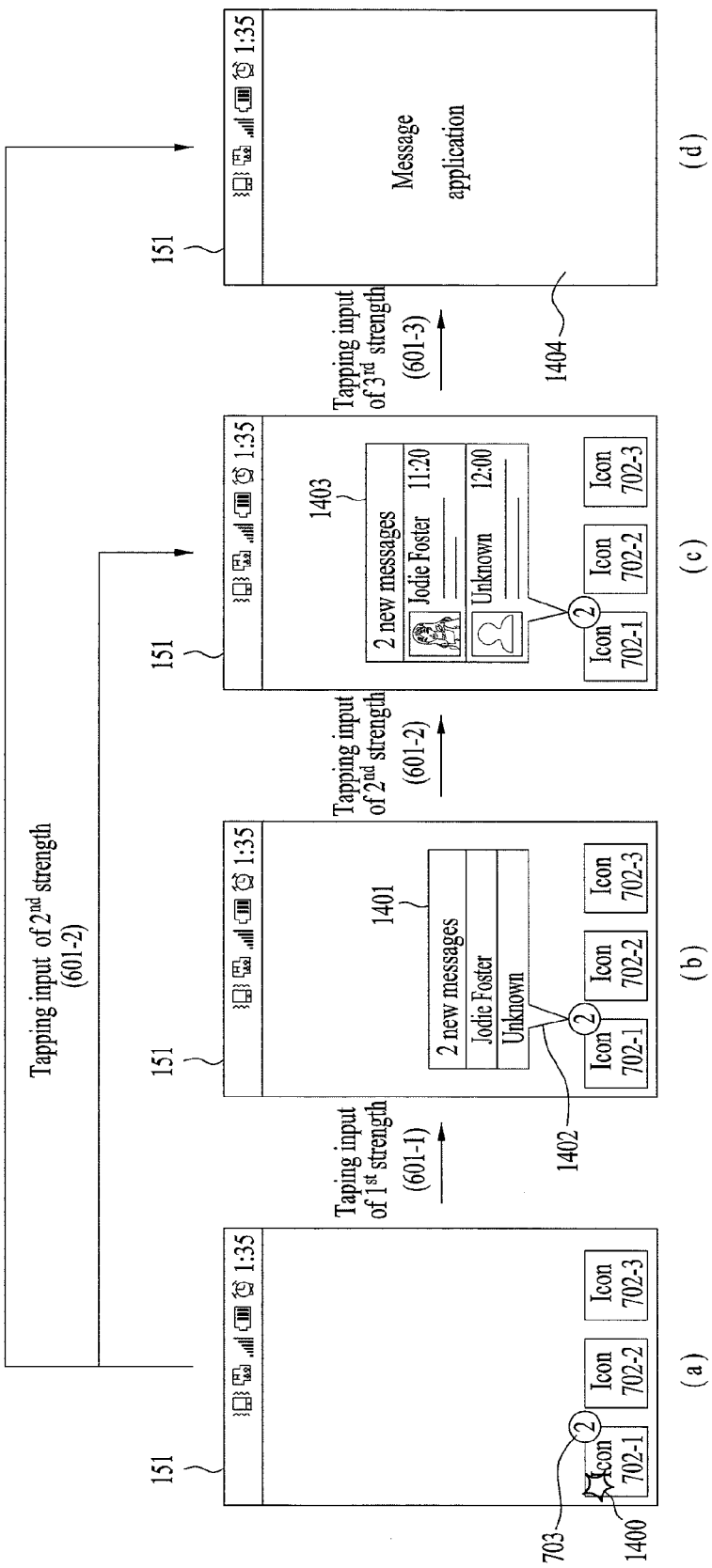

According to the example shown in FIG. 14, assume that the first application execution icon 702-1 corresponds to a message transceiving application. If so, the notification list popup window 1401 can output a notification list of the message transceiving application and the notification list can include a received message notification. According to the example shown in FIG. 14 (*b*), the notification list displayed on the notification list popup window 1401 indicates that there are two messages respectively received from 'Jodie Foster' and 'Unknown.'

According to one embodiment of the present invention, the notification list popup window 1401 can have a word balloon configuration and can further include a word balloon tail 1402 configured to indicate a notification list for a prescribed application. The controller 180 can control the word balloon tail 1402 of the notification list popup window 1401 to face a corresponding application execution icon 702. This is identically applicable to an extended notification list 1403 that will be described with reference to FIG. 14 (*c*).

In the state shown in FIG. 14 (*b*), if a tapping input 601-2 of a second strength is applied to a prescribed application execution icon 702, the controller 180 can provide a second output corresponding to a prescribed application. According to the example shown in FIG. 14 (*c*), an extended notification list popup window 1403 is configured to further display a detailed content of a notification.

The extended notification list popup window 1403 can include detailed contents for two received messages respectively received from 'Jodie Foster' and 'Unknown.' For instance, the extended notification list popup window 1403 can include information on incoming phone numbers and received times of the two messages respectively received from 'Jodie Foster' and 'Unknown.'

In the state shown in FIG. 14 (*c*), if a tapping input 601-3 of a third strength is applied to a prescribed application execution icon 702, the controller 180 can provide a third output corresponding to a prescribed application. According to the example shown in FIG. 14 (*d*), an execution screen 1404 of a message transceiving application is displayed as the third output.

As mentioned in the foregoing description, in response to the tapping inputs 601-1 to 601-3 sequentially applied to the run icon 702 of the prescribed application, the controller 180 can control the first to third outputs corresponding to the prescribed application to be sequentially displayed. Moreover, according to one embodiment of the present invention, instead of the sequential tapping input 601, one of the first to third outputs can be directly displayed using a tapping input 601 of a different strength.

In particular, in the state shown in FIG. 14 (*a*), if detecting that a tapping input 601-2 of a second strength is applied to a run icon 702-1 of a first application, the controller 180 can directly provide a second output corresponding to the first application (i.e., skipping a first output) (FIG. 14 (*c*)). Moreover, in the state shown in FIG. 14 (*a*), if detecting that a tapping input 601-3 of a third strength is applied to a run icon 702-1 of a first application, the controller 180 can directly provide a third output (cf. '1404' in FIG. 14 (*d*)) corresponding to the first application.

Thus, the above embodiments described with reference to FIGS. 12 to 14 relate to a controlling method based on a tapping input applied to a prescribed application run icon. In the following description, a controlling method to cope with tapping inputs to a plurality of application run icons is explained in detail with reference to FIG. 15.

Figure 15:
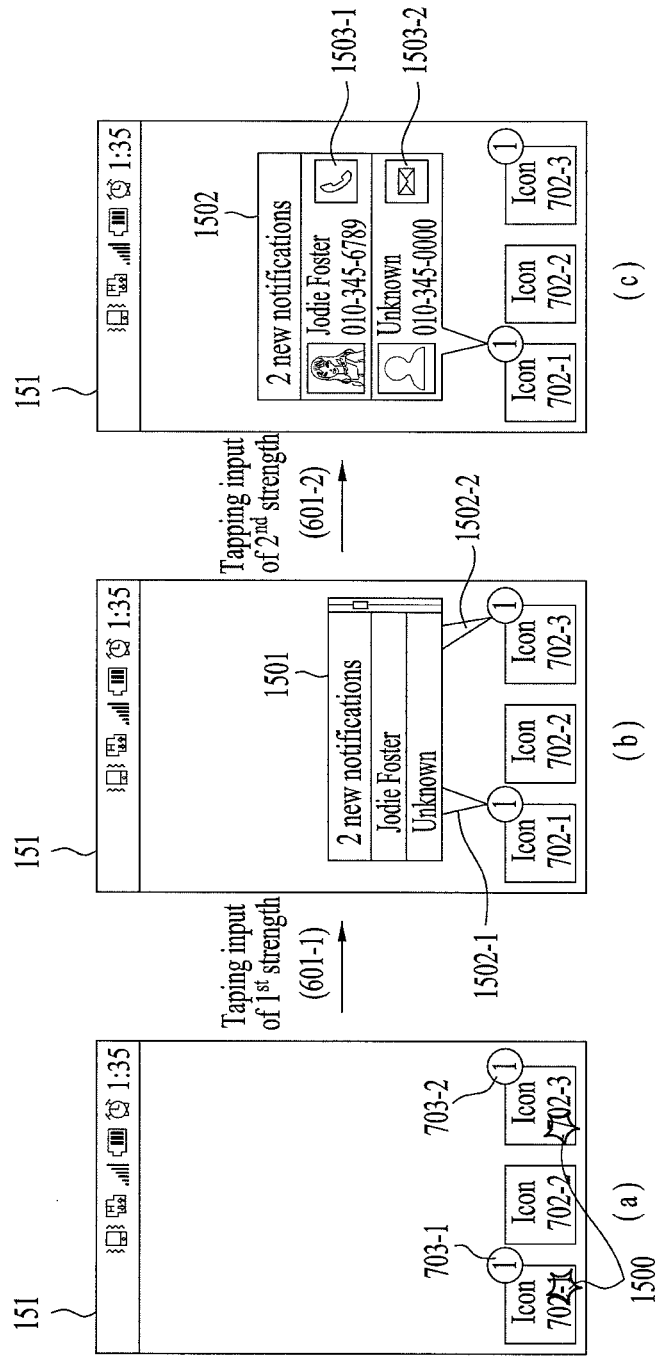

Referring to FIG. 15 (*a*), the controller 180 receives a tapping input 602-1 to a position 1500 of first and third application run icons 702-1 and 702-3 through the touchscreen 151. In response to the reception of the tapping input to the position 1500, referring to FIG. 15 (*b*), the controller 180 can display a notification list popup window 1501 for the first and third application run icons 702-1 and 702-3.

According to the example shown in FIG. 15, assume that a first application and a second application include a phone transceiving application and a message transceiving application, respectively. If so, the notification list popup window 1501 can include both a missed call notification of the phone transceiving application and a received message notification of the message transceiving application.

According to one embodiment of the present invention, the notification list popup window 1501 can have a word balloon configuration and can further include word balloon tails 1502-1 and 1502-2 each of which configured to indicate a notification list for a prescribed application. According to the example shown in FIG. 15, since the notifications correspond to the first application execution icon 702-1 and the third application execution icon 702-3, the word balloon tails 1502-1 and 1502-2 indicate the first application execution icon 702-1 and the third application execution icon 702-3, respectively.

When an additional tapping input 602-1 to the position 1500 is received, referring to FIG. 15 (*c*), the controller 180 can display an extended notification list popup window 1503 for the first and third application run icons 702-1 and 702-3. In particular, the extended notification list popup window 1503 can include details of a missed call notification 1503-1 and details of a received message notification 1503-2.

Figure 16:
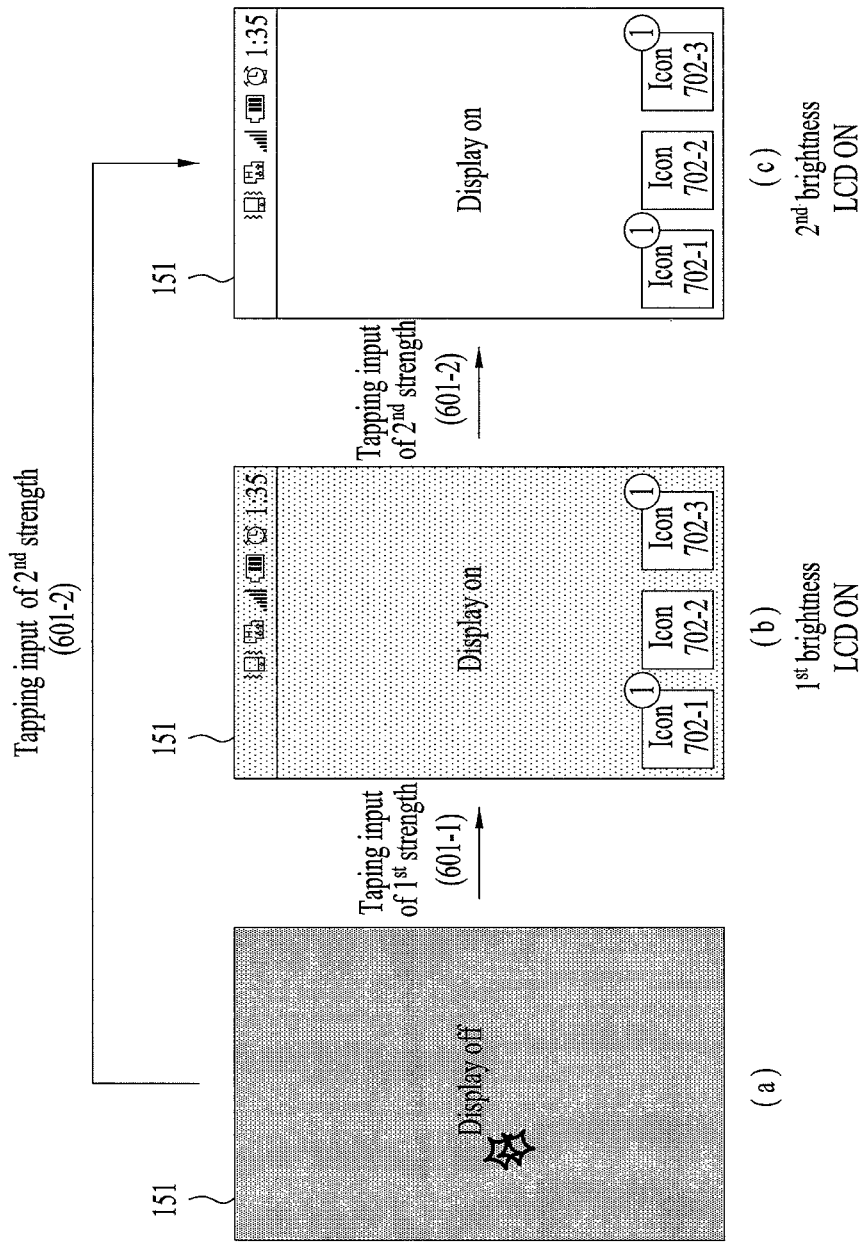
FIG. 16 is a diagram illustrating an output change in accordance with a strength of a tapping input according to a fifth embodiment of the present invention.

FIG. 16 is a diagram illustrating an output change in accordance with a strength of a tapping input according to a fifth embodiment of the present invention. In particular, FIG. 16 shows a change of brightness of the touchscreen 151 in response to a tapping strength.

Referring to FIG. 16 (a), assume that an output of the touchscreen 151 is deactivated or disabled. If a tapping input 602-1 of a first strength is received in the deactivated state of the touchscreen 151, referring to FIG. 16 (b), the controller 180 activates or enables the touchscreen 151 and can set the brightness of the touchscreen to a first brightness.

If a tapping input 602-2 of a second strength is received in the deactivated state of the touchscreen 151 (or in the state set to the first brightness like FIG. 16 (b)), referring to FIG. 16 (c), the controller 180 activates or enables the touchscreen 151 and can set the brightness of the touchscreen to a second brightness.

Figure 17:
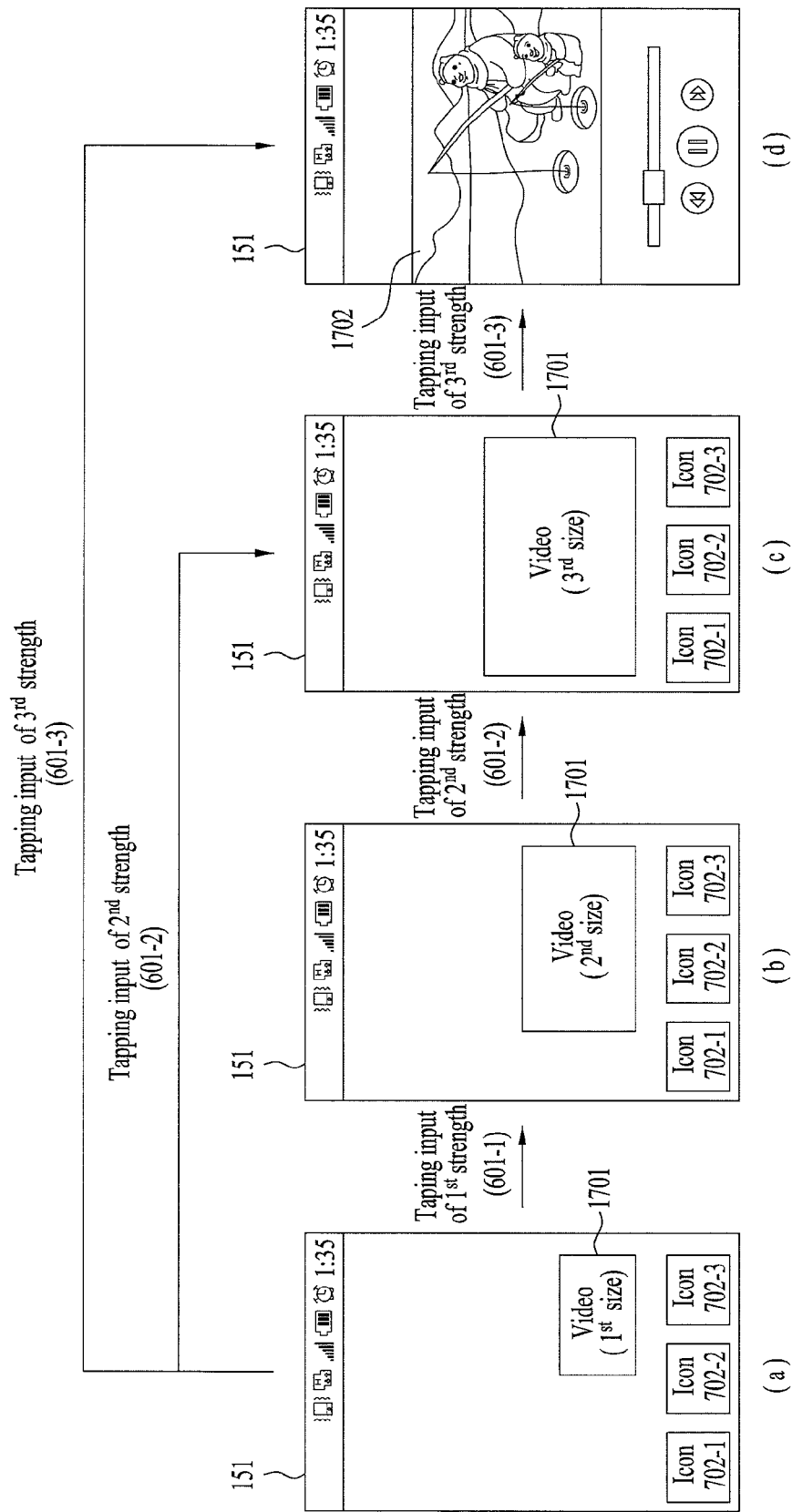
FIG. 17 is a diagram illustrating an output change in accordance with a strength of a tapping input according to a sixth embodiment of the present invention.

FIG. 17 is a diagram illustrating an output change in accordance with a strength of a tapping input according to a $6^{th}$ embodiment of the present invention. In particular, a method of controlling a screen size of a prescribed application displayed on a prescribed region of the touchscreen 151 is explained with reference to FIG. 17. Referring to FIG. 17 (a), the controller 180 displays an execution screen of a prescribed application (e.g., a video play application, etc.) through an application popup window 1702 of a first size. In response to a reception of a first tapping input 601-1, the controller 180 can increase the application popup window 1701 of the first size into a second size (FIG. 17 (b)). Subsequently, in response to a reception of a second tapping input 601-2, the controller 180 can increase the application popup window 1701 of the second size into a third size (FIG. 17 (c)).

Moreover, in response to a reception of a third tapping input 601-3, the controller 180 can display a execution screen by switching the application popup window 1701 of the third size to a full screen 1702. Meanwhile, while the application popup window 1701 of the first size is displayed in the state shown in FIG. 17 (a), as mentioned in the above description, the controller 180 can directly switch the application popup window 1701 of the first size to the third size or the full screen in response to the second tapping input 601-2 or the third tapping input 601-3. In addition, one embodiment of the present invention intends to propose a controlling method using a tapping input in response to an alarm output of an alarm application. Such an embodiment is described in detail with reference to FIG. 18 as follows.

FIG. 18 is a diagram illustrating distinguishing an operation in accordance with a strength of a tapping input in response to an alarm output according to one embodiment of the present invention. Referring to FIG. 18, while an alarm output is performed, if a tapping input 601-1 of a first strength is received, the controller 180 can perform a snooze operation on the alarm output. While an alarm output is performed, if a tapping input 601-2 of a second strength is received, the controller 180 can perform a turn-off operation on the alarm output.

Accordingly, embodiments of the present invention provide several advantages. According to at least one of embodiments of the present invention, a tapping input applied to a mobile terminal body can be detected advantageously and, a mobile terminal can be intuitively controlled through a tapping input applied to a mobile terminal body.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). In addition, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a wireless communication unit configured to provide wireless communication;
a touch screen configured to display information; and
a controller configured to:
receive a first tapping input on the touchscreen,
perform an output differently depending on whether a detected strength of the first tapping input is included in a first range or a second range,
deactivate the touchscreen based on a predetermined input,
receive the first tapping input while the touchscreen is deactivated,
activate only a first region of the touchscreen and display at least one application icon in the activated first region, when the first tapping input is included in the first range, and
activate only a second region of the touchscreen and display at least one application icon in the activated second region, when the first tapping input is included in the second range.

2. The mobile terminal of claim 1, wherein the first range is weaker than the second range in strength, and
wherein a display size of the first region is smaller than that of the second region.

3. The mobile terminal of claim 2, wherein a number of the at least one icon displayed in the first region is smaller than that of the at least one icon displayed in the second region.

4. The mobile terminal of claim 1, wherein the controller is further configured to:
deactivate the touchscreen based on a predetermined input,
receive the first tapping input while the touchscreen is deactivated,
activate only a first region of the touchscreen and display at least one application icon in the activated first region, when the first tapping input is included in the first range, and
activate only a second region of the touchscreen and display a notification list including at least one notification in the activated second region, when the first tapping input is included in the second range.

5. The mobile terminal of claim 4, wherein the at least one notification comprises at least one of a missed call notification, a received message notification and a schedule notification.

6. The mobile terminal of claim 4, wherein if a prescribed notification is selected from the displayed notification list, the controller is further configured to display detailed information on the selected prescribed notification.

7. The mobile terminal of claim 1, wherein the controller is further configured to:
receive a second tapping input while the controller is performing a first output, and perform a second output in response to the detected second tapping input.

8. The mobile terminal of claim 1, wherein the first tapping input comprises a knock-on input of touching the touchscreen at least twice in a prescribed time interval.

9. The mobile terminal of claim 1, wherein the touchscreen includes a sensor unit configured to detect a strength of the tapping input based on an area of the touch input.

10. A method of controlling a mobile terminal, the method comprising:
receiving a first tapping input on a touchscreen of the mobile terminal;
performing, via a controller of the mobile terminal, an output differently depending on whether a detected strength of the first tapping input is included in a first range or a second range;
deactivating the touchscreen based on a predetermined input;
receiving the first tapping input while the touchscreen is deactivated;
activating only a first region of the touchscreen and displaying at least one application icon in the activated first region, when the first tapping input is included in the first range; and
activating only a second region of the touchscreen and displaying at least one application icon in the activated second region, when the first tapping input is included in the second range.

11. The method of claim 10, wherein the first range is weaker than the second range in strength, and
wherein a display size of the first region is smaller than that of the second region.

12. The method of claim 11, wherein a number of the at least one icon displayed in the first region is smaller than that of the at least one icon displayed in the second region.

13. The method of claim 10, further comprising:
deactivating the touchscreen based on a predetermined input;
receiving the first tapping input while the touchscreen is deactivated;
activating only a first region of the touchscreen and displaying at least one application icon in the activated first region, when the first tapping input is included in the first range; and
activating only a second region of the touchscreen and displaying a notification list including at least one notification in the activated second region, when the first tapping input is included in the second range.

14. The method of claim 13, wherein the at least one notification comprises at least one of a missed call notification, a received message notification and a schedule notification.

15. The method of claim 13, wherein if a prescribed notification is selected from the displayed notification list, the method further comprising displaying detailed information on the selected prescribed notification.

16. The method of claim 10, further comprising:
receiving a second tapping input while performing a first output; and
performing a second output in response to the detected second tapping input.

17. The method of claim 10, wherein the first tapping input comprises a knock-on input of touching the touchscreen at least twice in a prescribed time interval.

18. The method of claim 10, wherein the touchscreen includes a sensor unit configured to detect a strength of the tapping input based on an area of the touch input.

* * * * *